(12) United States Patent
MacLeod (10) Patent No.: US 7,657,010 B1
(45) Date of Patent: Feb. 2, 2010

(54) SYSTEM AND METHOD FOR ESTABLISHING A HIGH SPEED NON-SWITCHED DATA CONNECTION

(75) Inventor: Jeffrey D. MacLeod, Mableton, GA (US)

(73) Assignee: Sprint Communications Company L.P., Overland Park, KS (US)

( * ) Notice: Subject to any disclaimer, the term of this patent is extended or adjusted under 35 U.S.C. 154(b) by 1445 days.

(21) Appl. No.: 10/372,563

(22) Filed: Feb. 21, 2003

(51) Int. Cl.
*H04M 11/00* (2006.01)

(52) U.S. Cl. ............... 379/93.01; 370/230; 370/235; 370/352; 370/353; 370/355; 379/88.13; 379/88.17; 379/93.06; 379/93.07; 379/343; 379/399.02; 379/413.02; 379/413.03; 379/413.04; 379/442; 709/204; 709/224; 709/228; 709/229

(58) Field of Classification Search ............... 370/230, 370/235, 351–356; 379/88.13, 88.17, 93.01, 379/93.06–93.07, 343, 399.02, 413.02–413.04, 379/442; 709/204, 224, 228–229
See application file for complete search history.

(56) References Cited

U.S. PATENT DOCUMENTS

| | | | | | |
|---|---|---|---|---|---|
| 5,341,418 | A | * | 8/1994 | Yoshida | 379/399.02 |
| 5,422,936 | A | * | 6/1995 | Atwell | 379/88.23 |
| 6,125,177 | A | * | 9/2000 | Whittaker | 379/243 |
| 6,282,189 | B1 | * | 8/2001 | Eames | 370/352 |
| 6,353,609 | B1 | * | 3/2002 | Ethridge et al. | 370/352 |
| 6,400,708 | B1 | * | 6/2002 | Bartholomew et al. | 370/352 |
| 6,480,487 | B1 | * | 11/2002 | Wegleitner et al. | 370/354 |
| 6,891,851 | B1 | * | 5/2005 | Demakakos | 370/467 |
| 6,996,067 | B1 | * | 2/2006 | Burke et al. | 370/248 |
| 7,239,627 | B2 | * | 7/2007 | Nattkemper et al. | 370/352 |
| 2002/0191635 | A1 | * | 12/2002 | Chow et al. | 370/463 |

OTHER PUBLICATIONS

Harry Newton, Newton's Telecom Dictionary, Feb. 2000, Telecom Books, 16th edition, pp. 581, 597-598.*

* cited by examiner

*Primary Examiner*—Hemant Patel (57) ABSTRACT

A system and method for establishing a high speed, substantially constant circuit based data connection over a conventional telephone line is provided. The circuit based connection is non-switched, thereby eliminating the need to establish a connection through a dial-up process. The circuit based connection is established between a user's terminal device and a digitizer, such as a basic rate interface transmission exchange card. The user's terminal device may be a modified version of a conventional integrated services digital connection modem. A user's computer, telephone, or other device may be connected to the user's terminal device to access an external network. The connection established in accordance with the present invention can transmit data at a rate far exceeding that of traditional dial-up connections.

40 Claims, 3 Drawing Sheets

SYSTEM AND METHOD FOR ESTABLISHING A HIGH SPEED NON-SWITCHED DATA CONNECTION

CROSS-REFERENCE TO RELATED APPLICATIONS

None.

STATEMENT REGARDING FEDERALLY SPONSORED RESEARCH OR DEVELOPMENT

None.

BACKGROUND OF THE INVENTION

Data connectivity, particularly Internet access, has become a critical demand of both households and businesses in today's world. Many existing communication networks were not designed and implemented to carry today's data traffic, instead being designed with the intention of carrying telephonic voice traffic. One problem with prior generation systems is the limited data capacity of the telephone lines that terminate in most homes and businesses, typically limited to the amount of data necessary to reasonably carry a voice telephone call. Further, telephonic switches often create a bottleneck in the system, and adding additional switches can be expensive. Moreover, the switches were not designed for the longer call lengths typical for data connections. The circuit-based technology of the existing telephony system was developed to handle analog transmission of voice telephone calls, rather than the digital connection better suited to the packet-based transmission of data.

Nevertheless, the "dial-up" Internet connection has become a fixture of computing life. While this form of accessing the Internet by dialing over existing switched circuit-based telephone lines faces numerous limitations, it is readily available to virtually all households and businesses in the United States, as well as many regions abroad. Dial-up Internet access provides slow data transmission speeds, making Internet usage a frustrating experience. Dial-up Internet access also occupies the phone line used for the connection, thereby interfering with the line's ability to place and receive voice calls. Even the process of initiating a dial-up Internet connection using a computer modem can be a source of frustration to some users. However, the wide spread availability of dial-up Internet access has made dial-up service extremely common, even if its shortcomings make it less than popular with users.

Numerous attempts have been made to provide higher speed, superior data connections for home and business use. The provisions of such a connection, particularly for home use with limited budgets, can be daunting. One attempted solution is digital subscriber lines, or DSLs. A DSL connection uses a telephone line to provide an extremely high data transmission rate, and a continuous connection, but faces several obstacles. First, the geographical distance that a DSL line can extend from a central office is sharply limited. This limitation renders many consumers wishing to access the Internet outside of the reach of this technology. Additionally, technical difficulties and the high cost of installing DSL servers have limited its potential.

Integrated services digital network connections, or ISDN connections, are another attempt to use the existing telephony system to provide higher speed data connections. While ISDNs do provide a very high rate of data transfer in its connection, they require a user to place a data call, much as with a dial-up connection. While the rate of data exchange in that dial-up call is higher than for a standard telephone connection, the inconvenience of performing the dial-up remains, as does the stress placed upon the switch system in the telephonic network. Not all telephone equipment is suitable for use with an ISDN connection, which often requires expensive equipment upgrades before an ISDN connection can be contemplated. As with DSL service, ISDN service also suffers from limited reach. Even when put together, ISDN and DSL services leave many outside of their reach.

Attempts to provide data connectivity outside of the traditional telephony network have met with mixed results. Data connections using cable television lines can provide a very high speed connection, but are only available to cable television subscribers. Furthermore, data connections using cable telephone lines require special equipment to send and receive signals. While the data connection speed over a cable television line is, theoretically, rather high, the actual speed experienced by a user varies dramatically depending upon the number of users accessing the Internet via a particular cable television trunk. If a user resides in a neighborhood with a high percentage of cable television data usage, all users' performance will suffer. Cable television data connections can also provide additional computer security concerns over and above the concerns experienced by the typical user of dial-up, DSL, or ISDN services.

Another recent, but not entirely satisfactory, method of providing a higher speed data connection is to use a satellite signal to transmit data to a user. These connections are often limited in that data may be transmitted from a satellite to the user, but not from the user to the satellite. Instead, data transmitted by the user must be transmitted via traditional telephone lines, thereby requiring the user to dial-up a service provider and occupy a telephone line while on the Internet. Such satellite connections are often problematic in that the data link can suffer degradation or total loss due to meteorological and atmospheric conditions. Installing, setting up and maintaining the satellite equipment can also be difficult.

None of the above discussed high speed alternatives to dial-up data connection have significantly supplanted dial-up Internet access for the majority of Internet users. While most can function well within the narrow parameters in which they can be ideally implemented, all are sharply limited by factors such as geographic range, complexity, cost of installation, and real world performance considerations. A need exists for a data connection solution that provides a high speed data connection relative to conventional dial-up service and that provides a constant, always on connection that can also reach the vast majority of all telephone customers. Additionally, such a system should work in harmony with existing components of the telephony system to deliver data and, where appropriate, voice services to users. Such a system should not add to the congestion to the telephony switching system and should be simple and inexpensive to implement and install.

SUMMARY OF THE INVENTION

The present invention provides a system and method for establishing a constant high speed connection between a users' terminal device and an external network, such as the Internet. In accordance with the invention, a circuit-based telephony connection is established between the users' terminal device and a digitizer. The connection between the user's terminal device and the digitizer does not include any intermediate switch. A packet based connection is established between the digitizer and an external network. The connection between the digitizer and the external network may be established using a network termination device. The digitizer converts between the circuit-based signal with the user's terminal device and the packet based signal that is used to connect with the external network. Because the circuit based connection between the terminal device and the digitizer is not routed through a switch, no dialing is necessary to establish a data connection. The non-switched connection allows a data transmission rate exceeding the data rate of a dial-up connection. Using a non-switched connection also alleviates the burden placed upon telephony switches by data connections.

BRIEF DESCRIPTION OF THE SEVERAL VIEWS OF THE DRAWINGS

The present invention is described in detail below with reference to the attached drawing figures, wherein.

DETAILED DESCRIPTION OF THE INVENTION

Figure 1:
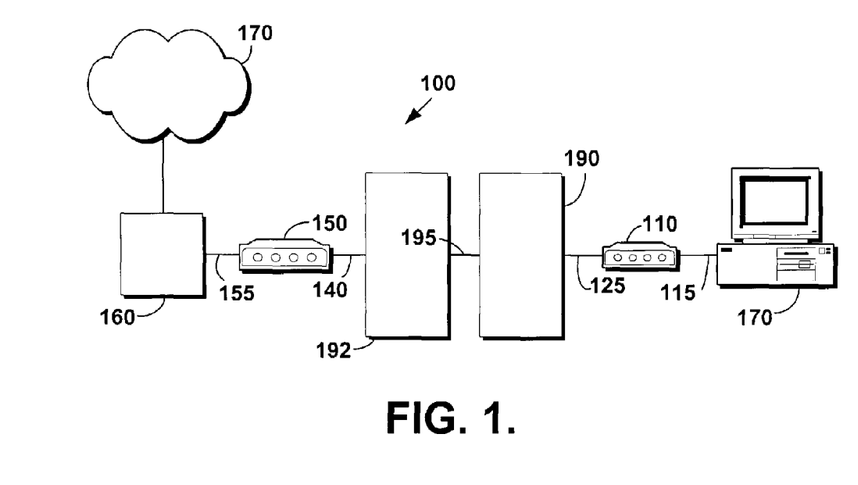
FIG. 1 schematically illustrates a prior art ISDN connection.

FIG. 1 illustrates a prior art ISDN connection system 100. An ISDN modem 110 forms a circuit-based connection 125 with a public switch 190. The switch 190 routes the ISDN data call based on the number dialed by the modem 110, ultimately connecting the data call via the telephony network 195 to another switch 192 that then connects via link 140 to a network modem 150. The network modem 150 converts signals between formats suitable for transmission over the telephony network 195 and for transmission to a processor 160 via a connection 155. The processor 160 provides access to an external network such as the Internet and may be a router or other similar component. Between switch 190 and switch 192, the telephony network 195 may include a wide variety of telephony equipment such as assorted signal carriers, switches, multiplexers to combine and separate signals, equipment for converting the signal type from a circuit based signal to packet based signal for transmission. The actual physical distance covered by telephony network 195 may be even thousands of miles. The chief disadvantages of data connections such as the ISDN system 100 have been briefly discussed above. The physical distance of the circuit based connection 125 between the modem 110 and the public switch 190 is sharply limited. Further, the use of switch 190 requires that the user initiate a data connection by dialing a telephone number using modem 110. Routing data calls through switch 190 also stresses the local telephone network by occupying the switch 190 longer than typical for a voice call.

Figure 2:
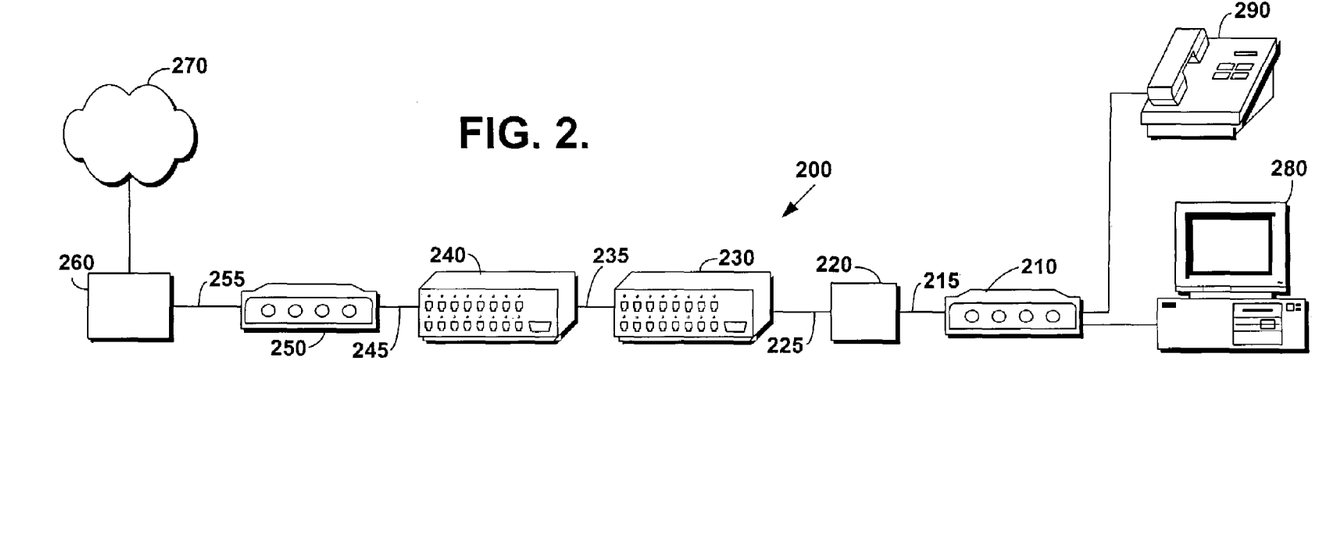
FIG. 2 schematically illustrates a networking system in accordance with the present invention.

Referring now to FIG. 2, a high speed data connection system 200 in accordance with the present invention is illustrated. The system 200 includes a terminal device 210. A terminal device 210 converts between the circuit based signal transmitted over a telephone line and a format, typically digital, used with a user device such as a computer. The terminal device 210 may be a specially adapted ISDN modem. ISDN modems are commercially available from a wide variety of venders. The manner in which a commercially available ISDN modem may be adapted for use with the present invention is disclosed in conjunction with FIG. 4. A circuit based connection 215 is formed between the terminal device 210 and a digitizer 220. The circuit based connection 215 may be formed over a telephone line. Digitizer 220 is a device that converts between circuit based and packet based signals. This allows the digitizer 220 to maintain a circuit based connection 215 with the terminal device 210 while maintaining a packet based connection 225 with the remainder of the system 200. The digitizer 220 may be a Basic Rate Interface Transmission Extension card. Basic Rate Interface Transmission Extension cards, sometimes referred to as "Brite" cards, are commercially available, standards based devices used within the telecommunications industry to convert between circuit based and packet based signals. Brite cards may be easily installed in channel banks commonly used in present telecommunications networks. Such a conversion is often performed, after switching, to transmit the signal over a distance.

The digitizer 220 maintains a packet based connection 225 with a first multiplexer 230. The multiplexer 230 may be a channel bank into which a Brite card may be inserted to function as the digitizer 220. A multiplexer is a well-known, commercially available device used in the telecommunications industry to combine and separate signals for transmission over high bandwidth connections. For example, a multiplexer may combine a plurality of signals inputted from individual phone lines for simultaneous transmission over a single fiber optic cable. Another multiplexer will then separate the plurality of signals back to their constituent lines for ultimate connection. As illustrated in FIG. 2, the first multiplexer 230 is connected with a second multiplexer 240 by a high bandwidth connection 235. The first multiplexer 230 and the second multiplexer 240 may be separated by a wide geographical distance, and the high bandwidth connection 235 may comprise more than one discrete connection, and may include additional components, such as switches and additional multiplexers, along its route. The second multiplexer 240 is connected to a network termination device 250 via a link 245. The network termination device 250 may be a modem for formatting signals transmitted to and received from the external network. The network termination device may connect to the external network through a processor 260. The processor 260 then connects to an external network 270, such as the Internet. The processor 260 may be a router or other component to access the Internet.

In some applications, the digitizer 220 and the network termination device 250 may be a single device. In such a configuration, the digitizer 220 would convert between a circuit based and a packet based signal while formatting the digital signal for transmission to the external network via the processor 260. In such a configuration, the second multiplexer 240 may be omitted or may be connected between the digitizer 220 the functions as a network termination device 250 and the processor 260.

The system 200 allows for the user's termination device 210 to be linked to the external network 270 without routing the circuit based connection between the termination device 210 and the digitizer 220 through an intermediate switch. This allows for the connection to be substantially constant, in that it does not require the establishment of a dial-up connection, and also allows for increased data capacity. By bypassing the public switches and establishing a direct connection with the digitizer 220, the data capacity of the system 200 is substantially greater than that of a dial-up connection. For example, the system 200 enabled a data rate of approximately 128 Kbs compared to a dial-up connection, which at present has a maximum data rate of 56 Kbs. Those skilled in the art will appreciate that the difference between system 200 and a dial-up connection will vary for a particular deployment depending upon a variety of factors such as the hardware used, data volume, line condition and other factors.

Of course, a user will wish to use the termination device 210 to access the external network 270 via a user device. One such device is a computer 280, such as may be used to access the Internet via system 200. A telephone 290 may also be used, provided the telephone 290 and termination device 210 are compatible. Either a telephone 290 adapted for use with a modem may be used, or the termination device 210 may include an output that connects with a standard telephone. The termination device 210 may be configured to connect to a telephone 290 using a conventional telephone cord. When a telephone 290 is used, a voice call may be connected using the system 200 by transmitting voice over Internet protocol signals over the external network 270 in accordance with well-known procedures. It should be noted that multiple user devices, such as both a computer 280 and a telephone 290, may be connected to the external network 270 via the termination device 210. While the user of multiple user devices will split the data capacity of system 200 between the two devices, the total data capacity of system 200 exceeds that possible over a conventional dial-up connection, and each user device may receive data bandwidth comparable to that of conventional dial-up connection. This ability to connect multiple devices simultaneously represents a distinct improvement over dial-up Internet access, as the accessing of an external network 270 such as the Internet using a computer 280 does not preclude use of a voice telephone 290 upon the same circuit based connection 215.

Figure 3:
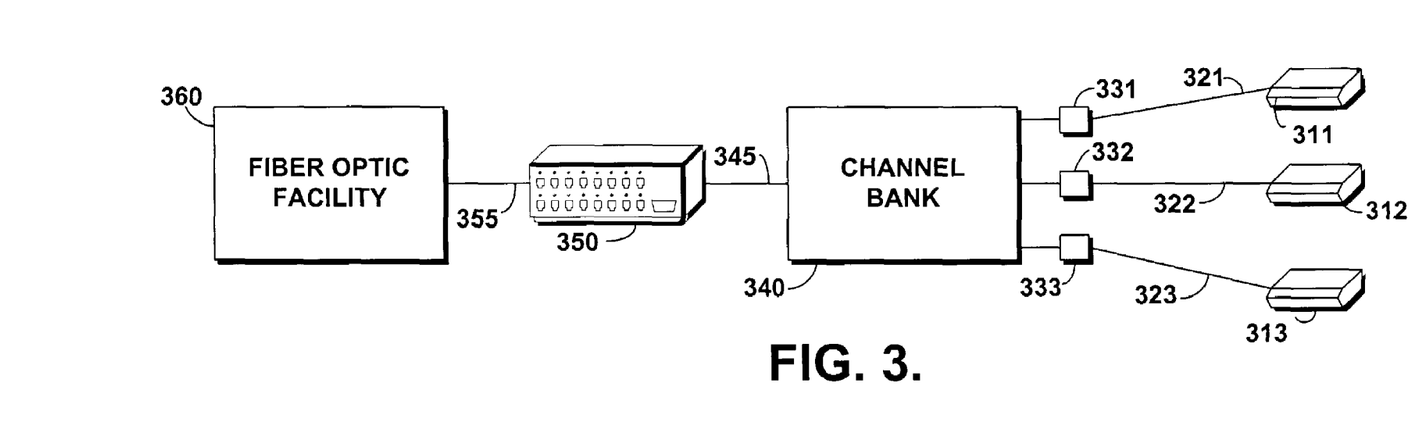
FIG. 3 illustrates a communications system in accordance with the present invention.

Referring now to FIG. 3, the local components of the high speed data connection system 200 are illustrated in greater detail. A first terminal device 311, a second terminal device 312, and a third terminal device 313 are illustrated. Each terminal device would represent, for example, a modified ISDN modem used in conjunction with the present invention in a user's home. The first terminal device 311 is connected to the telephone network by line 321. The second terminal device 312 connects to the telephone network by line 322. The third terminal device 313 is connected to the telephone network by line 323. Line 321, line 322, and line 323 input into a channel bank 340. The channel bank 340 includes a plurality of Brite cards. Line 321 connects to digitizer 331, line 322 connects to digitizer 332, and line 323 connects to digitizer 333 to digitize their circuit based signals. The digitized signals are transmitted on a digital connection 345 to a multiplexer 350. The digital connection 345 will likely be a DS1, a DS3, or other high speed connection. The multiplexer 350 is used to combine and separate a plurality signals for transmission over a high capacity cable or other connection. The multiplexer 350 may take many forms, such as M13 multiplexers or add drop multiplexers, sometimes referred to as "ADM". More than one multiplexer 350 may be used as increasing numbers of individual signals are combined for transmission over higher and higher bandwidth connections. Ultimately, a digital connection 355 will transmit the signal to a fiber optic facility 360. The fiber optic facility 360 essentially represents the end of the local telephone company's facilities and the beginning of the Internet Service Provider's facilities. The Internet Service Provider provides, for example, the processor 260 illustrated in FIG. 2 that accesses the Internet.

Figure 4:
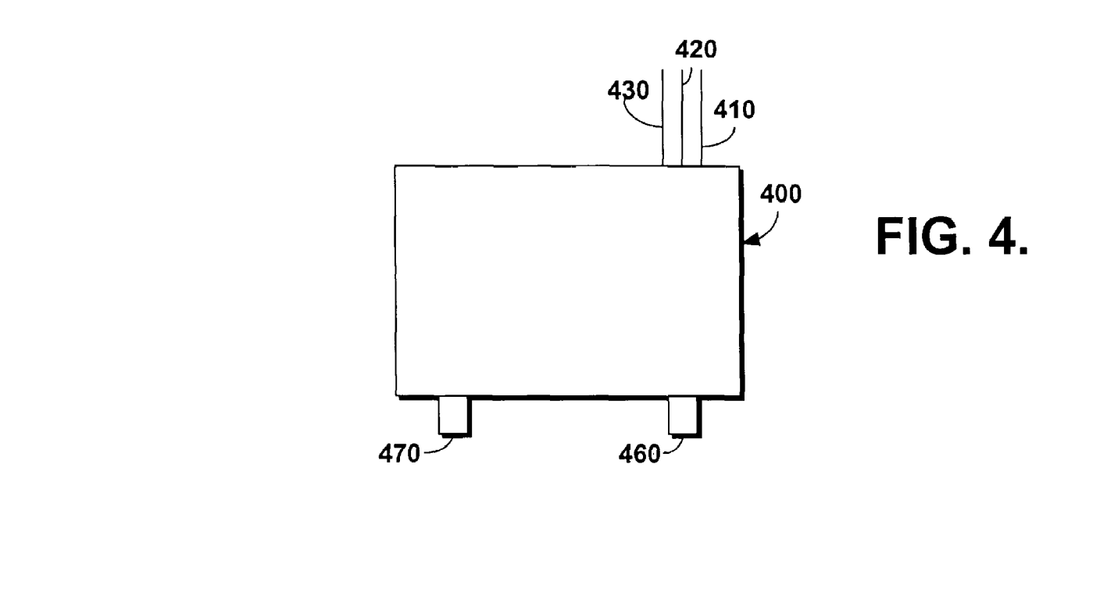
FIG. 4 schematically illustrates one termination device that maybe used with the present invention.

Referring now to FIG. 4, a modem 400, which is one possible embodiment of a termination device 210, is illustrated in greater detail. Modem 400 may comprise a modified version of a standard commercially available ISDN modem. The modem 400 transmits and receives data via a first channel 410 and a second channel 420. The modem 400 may transmit data using any connection protocol, and may use the standard protocols developed for use with an ISDN connection. A third channel 430, often referred to in the art as the "D channel" is used to signal the modem 400 as to whether a call is in progress. In accordance with the present invention, the modem 400 is modified using known processes to continuously signal on the D channel 430 that a data call is in progress. This process essentially locks the modem 400 in an active state. This D Channel signal serves to prevent the modem 400 from terminating the network connection. The modem 400 also includes a first user output 460 and a second user output 470. The first user output 460 and the second user output 470 allow a user to connect devices, such as a computer 280 and a telephone 290 to the modem 400 to access the external network 270. While any number of connections to user devices are possible using modem 400, two user outputs are shown in FIG. 4 for illustrative purposes. A user may wish to use multiple user outputs for a variety of reasons. For example, a user may wish to access the Internet while conversing on the telephone, which may be accomplished with the present invention using a single telephone line. A user may also, for example, wish to access the Internet from more than one computer. Furthermore, since the data connection established by system 200 is a high speed connection at a rate of approximately twice that of a dial-up connection, the inclusion of two user outputs allows each of the two devices attached to the external network 270 via modem 400 to be connected at a data rate comparable to that presently available via dial-up.

Figure 5:
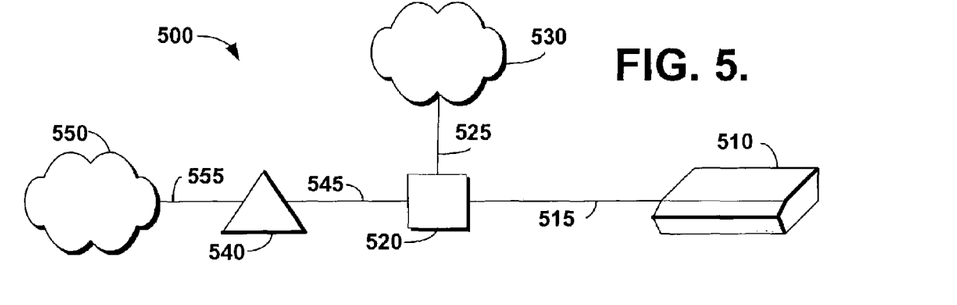
FIG. 5 schematically illustrates a non-switched data connection in accordance with the present invention.

Referring now to FIG. 5, a non-switched data connection in accordance with the present invention is illustrated. The user's termination device 510 is linked via a circuit based connection 515 to a digitizer 520. The circuit based connection 515 may be formed using a telephone line. Digitizer 520 signals using a packet based format with an external network 530 via an appropriate link 525. Digitizer 520 converts between the circuit based signal it maintains with the termination device 510 and the packet based signal maintains with the external network 530. Shown in FIG. 5 is a switch 540 that is bypassed by the present invention. Rather than routing a signal from the user's termination device 510 through switch 540 via line 545, the user's circuit based signal transmitted via connection 515 is digitized by Digitizer 520 and ultimately transported to the external network 530 without an intervening switch between the digitizer 520 anted the termination device 510. The external network 530 may be used to carry signals from the user's termination device 510 that serve any function, including data transfer and voice over Internet protocol signals. As discussed herein, bypassing the switch 540 allows a substantially constant data connection to be maintained between the user's termination device 510 and the external network 530. Bypassing the switch 540 also alleviates congestion on public switches employed by local telephone companies. Furthermore, bypassing the switch 540 allows for an increased data connection rate and an extended geographical range for the high speed connection system in accordance with the present invention.

Figure 6:
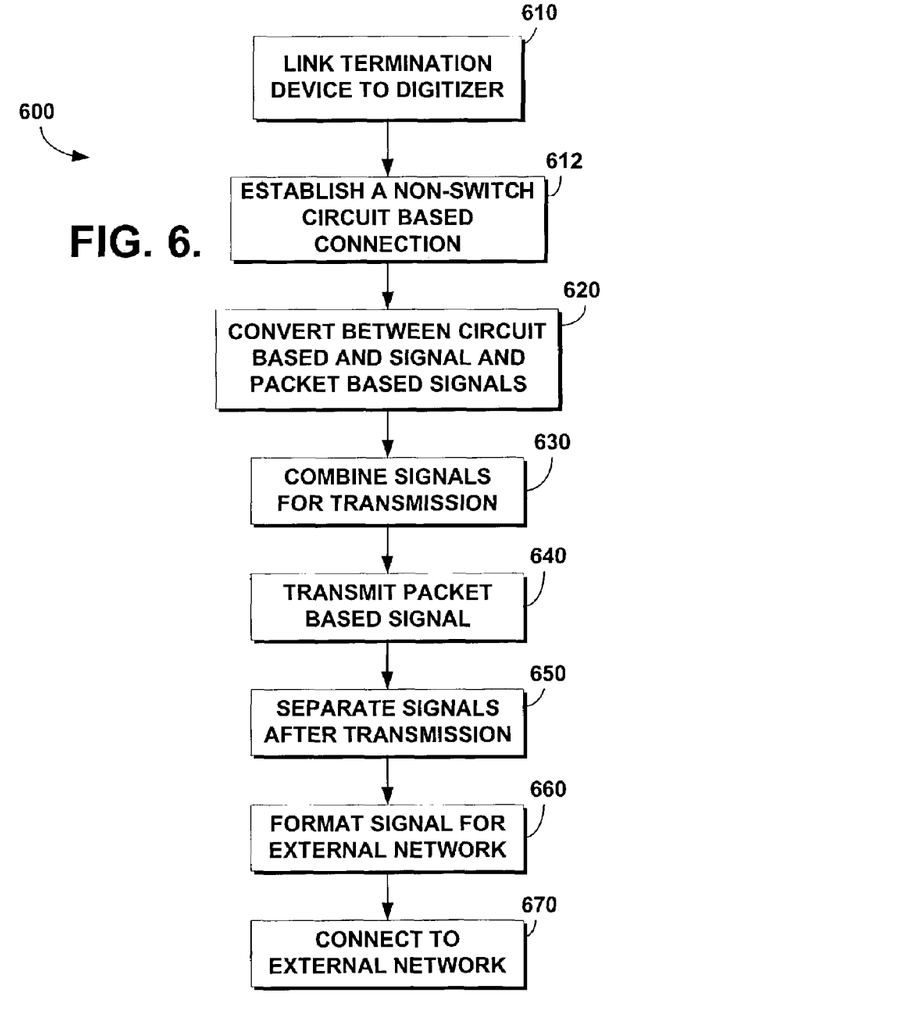
FIG. 6 illustrates a method of establishing a constant, high speed, non-switched data connection in accordance with the present invention.

Referring now to FIG. 6, a method 600 of forming a constant high speed, non-switched connection in accordance with the present invention is disclosed. The method 600 begins by linking a termination device to a digitizer 610. The step of linking 610 includes the substep 612 of establishing a non-switched circuit based connection. Substep 612 may be accomplished by connecting a user's telephone line directly to a digitizer. Such a connection may occur at a channel bank. Next, conversion between circuit based and packet based signaling occurs in step 620. Conversion step 620 can be performed using a digitizer such as a Brite card. Next, the packet based signal with the user's termination device is combined with other signals for transmission in multiplexing step 630. Multiplexing step 630 may also include the de-multiplexing of signals transmitted from an external network to the user's termination device. The combined signals are then transmitted using high capacity connections in transmission step 640. The combined signals are separated after transmission in de-multiplexing step 650. De-multiplexing step 650 may also include the multiplexing of signals transmitted from an external network to the user's termination device. The signals to and from the user's termination device are formatted for access to the external network in formatting step 660. Formatting step 660 may be performed by the digitizer or by a network termination device. The connection is then made to the external network in connection step 670. The external network may be the Internet. While certain steps of method 600 can be omitted, such as the multiplexing step 620 and the de-multiplexing step 650, most practical applications of the present invention in the current telecommunications environment will employ these steps. Method 600 can be implemented in a variety of ways, including through the use of a machine readable media having machine readable instructions for executing all or part of method 600.

In accordance with the foregoing, a new system and method for establishing a high speed non-switched and continuous connection between a user's termination device and an external network is provided. While the present invention may be used with a variety of components, both existing now and to be developed in the future, it can be implemented using present components such as modified ISDN modems, Brite cards, multiplexers, and telecommunications network connections. The present invention provides an advantage of a high speed connection at roughly double the rate available using a dial-up connection. Further, the present invention provides a continuous connection that does not have to be activated through a dial-up process. While the connection may have to be severed for occasional maintenance or due to interruptions, the system can substantially provide a continuous data connection with a user. This can be useful both for the user and for a Service Provider to exchange information over the system during times when that interchange will not interfere with a user's operations and use of the connection. The present invention also allows Service Providers to connect virtually all telephone customers with its service, as it lacks the stringent and short distance constraints of other, higher speed service such as ISDN connections and DSL.

The present invention provides a high speed connection at a data capacity exceeding that available using a dial-up connection. The connection established in accordance with the present invention is effective over a range that far exceeds that of other high speed connections such as ISDN and DSL. Further, the present invention provides a continuous connection that does not have to be activated through a dial-up process. While the connection may have to be severed for occasional maintenance or due to interruptions, the system can substantially provide a continuous data connection with a user. This can be useful both for the user and for a service provider to exchange information over the system during times when that interchange will not interfere with a user's operations and use of the connection. By avoiding the need to switch at the local level, congestion and overuse of the switching system can be avoided.

The present invention has been described in relation to particular embodiments, which are intended in all respects to be illustrative rather than restrictive. Alternative embodiments will become apparent to those skilled in the art that do not depart from the scope of the invention. It will be understood that certain features and subcombinations are of utility and may be employed without reference to other features and subcombinations are of utility and may be employed without reference to other features and subcombinations. Such variations are contemplated within the scope of the claim. Not all steps listed in the various figures need be carried out in the specific order described.

What is claimed is:

1. A system wherein a user may connect a user device to an external network, the system comprising:
   a termination device that maintains a substantially constant connection by continuously signaling that a data call is in progress and is controlled by the user connected to the user device;
   a digitizer directly linked to the termination device controlled by the user with a non-switched circuit based connection, the digitizer converting between circuit based and packet based signals; and
   a network termination device linked to the digitizer using a packet based connection, the network termination device connecting to the external network;
   wherein the system provides a high speed data connection between the user and the external network.

2. The system of claim 1 whereby the system further provides a substantially constant connection between the termination device controlled by the user and the external network.

3. The system of claim 1 wherein the termination device controlled by the user is a modem.

4. The system of claim 3 wherein the external network is the Internet.

5. The system of claim 1 wherein the digitizer is a Basic Rate Interface Transmission Extension card.

6. The system of claim 5 further comprising a first multiplexer that interfaces with the Basic Rate Interface Transmission Extension card to receive the packet based output from the card and establish a packet based connection with the network termination device, the multiplexer combining and separating a plurality of signals for transmission via the packet based connection.

7. The system of claim 6 further comprising a second multiplexer linked between the first multiplexer and the network termination device, the second multiplexer combining and separating a plurality of signals for transmission via the packet based connection.

8. A system for establishing a substantially constant circuit based data connection between a user controlled termination device and an external network at a high rate of data transfer, the system comprising;
   a means for converting between circuit based signals and packet based signals, the means for converting directly linked to the user controlled termination device via a non-switched circuit based connection maintained by the termination device continuously signaling that a data call is in progress;
   a network termination device for formatting signals transmitted to and received from the external network, the network termination device linked to the means for converting via a packet based connection; and a means for connecting at least one user device to the substantially constant circuit based data connection with the user controlled termination device.

9. The system of claim 8, wherein the means for converting between circuit based signals and packet based signals is a Basic Rate Interface Transmission Extension card.

10. The system of claim 8, wherein the network termination device is a network modem.

11. The system of claim 8, wherein the means for connecting at least one user device to the substantially constant circuit based connection is an integrated services digital network modem.

12. The system of claim 11, wherein the integrated services digital network modem maintains a constant circuit based connection by continuously signaling that a data call is in progress.

13. The system for claim 8 further comprising:
a first means of combining and separating a plurality of signals that processes packet based signals transmitted to and from the means for converting between circuit based signals and packet based signals; and
a second means for combining and separating a plurality of signals that processes signals between the first means for combining and separating a plurality of signals and the network termination device.

14. The system of claim 13 wherein the first means for combining and separating a plurality of signals and the second means for combining and separating a plurality of signals comprise multiplexers.

15. The system of claim 14 wherein the system provides a data rate exceeding the data rate of a dial-up connection.

16. The system of claim 15 wherein the external network is the Internet.

17. The system of claim 15 further comprising a telephone connected to the user controlled termination device, and wherein data packets originating from the telephone are transmitted to the external network using a voice over Internet protocol procedure.

18. A high speed data connection system to allow a user to access an external network Internet, the high speed data connection system providing a substantially constant non-switched circuit based connection with a termination device controlled by the user, the system comprising;
a digitizer directly linked to the termination device controlled by the user via the substantially constant non-switched circuit based connection maintained by the termination device continuously signaling that a data call is in progress, the digitizer operating to convert between circuit based and packet based signals;
a first multiplexer linked to the digitizer to combine and separate a plurality of packet based signals;
a second multiplexer linked to the first multiplexer via a packet based network;
a network modem linked to the second multiplexer; and
a processor linked to the network modem, the processor providing access to the external network Internet.

19. The system of claim 18 wherein the digitizer comprises a Basic Rate Interface Transmission Extension card.

20. The system of claim 18 wherein the substantially constant circuit based connection with the termination device controlled by the user is established over a telephone line.

21. The system of claim 19 wherein the substantially constant circuit based connection with the termination device controlled by the user is established over a telephone line.

22. The system of claim 18 wherein the processor is a router.

23. The system of claim 21 wherein the processor is a router.

24. In a telecommunications system, a method for establishing a high speed, substantially constant data connection between a termination device controlled by a user and an external network comprising:
signaling to the termination device controlled by the user and receiving signals from the termination device using a substantially constant circuit based connection maintained by continuously signaling that a data call is in progress without routing the circuit based connection through a telephony switch;
converting between circuit based and packet based signals at a digitizer that is directly linked to the termination device controlled by the user;
signaling to the external network and receiving signals from the external network using packet based signals; and
linking at least one user device to the termination device controlled by the user.

25. The method of claim 24 further comprising formatting the packet based signal for accessing the external network.

26. The method of claim 25 further comprising combining packet based signals to and from the termination device with a plurality of other signals for transmission through high capacity network connections.

27. The method of claim 24 wherein the linking at least one user device comprises linking a computer to the termination device.

28. The method of claim 24 wherein the linking at least one user device comprises linking a telephone to the termination device.

29. The method of claim 24 further comprising linking multiple devices to the termination device, the multiple devices receiving proportional amounts of data capacity from the high speed data connection.

30. A computer-readable media having computer-executable instructions embodied thereon that, when executed, perform a method for establishing a high speed, substantially constant data connection between a termination device controlled by a user and an external network, the method comprising:
signaling to the termination device controlled by the user and receiving signals from the termination device using a substantially constant circuit based connection maintained by continuously signaling that a data call is in progress without routing the circuit based connection through a telephony switch;
converting between circuit based and packet based signals at a digitizer that is directly linked to the termination device controlled by the user;
signaling to the external network and receiving signals from the external network using packet based signals; and
linking at least one user device to the termination device controlled by the user.

31. A system whereby a user may connect a user device to an external network, the system comprising:
a termination device that maintains a substantially constant connection by continuously signaling that a data call is in progress and is controlled by the user connected to the user device;
a digitizer to convert between circuit based and packet based signals;
a non-switched circuit based connection directly linking the digitizer and the termination device controlled by the user; and a packet based connection between the digitizer and the external network;

wherein the system provides a high speed data connection between the termination device controlled by the user and the external network.

32. The system of claim 31 wherein the digitizer comprises a Basic Rate Interface Transmission card.

33. The system of claim 31 wherein the external network is the Internet.

34. The system of claim 31 wherein the circuit based connection between the digitizer and the termination device controlled by the user comprises a substantially constant connection.

35. The system of claim 34 wherein the digitizer formats signals for transmission between the external networks and the termination device controlled by the user.

36. The system of claim 34 further comprising a network termination device linked between the external network and the digitizer wherein the network termination device formats signals for transmission between the external network and the digitizer.

37. The system of claim 35 further comprising a processor, wherein the digitizer connects to the external network through the processor.

38. The system of claim 37 wherein the processor is a router.

39. The system of claim 36 further comprising a processor, wherein the network termination device connects to the external network through the processor.

40. The system of claim 39 wherein the processor is a router.

* * * * *

UNITED STATES PATENT AND TRADEMARK OFFICE
CERTIFICATE OF CORRECTION

PATENT NO.       : 7,657,010 B1                                             Page 1 of 1
APPLICATION NO. : 10/372563
DATED            : February 2, 2010
INVENTOR(S)      : Jeffrey D. MacLeod It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1675 days.

Signed and Sealed this

Thirtieth Day of November, 2010

David J. Kappos
*Director of the United States Patent and Trademark Office*